United States Patent
Duca

(10) Patent No.: US 10,061,947 B2
(45) Date of Patent: Aug. 28, 2018

(54) WIRELESS USER AUTHENTICATION SYSTEM

(71) Applicant: Christopher J. Duca, Cape Coral, FL (US)

(72) Inventor: Christopher J. Duca, Cape Coral, FL (US)

(*) Notice: Subject to any disclaimer, the term of this patent is extended or adjusted under 35 U.S.C. 154(b) by 0 days.

(21) Appl. No.: 15/629,581

(22) Filed: Jun. 21, 2017

(65) Prior Publication Data

US 2017/0364717 A1    Dec. 21, 2017

Related U.S. Application Data

(60) Provisional application No. 62/352,715, filed on Jun. 21, 2016.

(51) Int. Cl.
| | |
|---|---|
| *G06K 7/08* | (2006.01) |
| *G06K 19/06* | (2006.01) |
| *G06K 7/10* | (2006.01) |
| *G06K 19/07* | (2006.01) |
| *G06K 19/077* | (2006.01) |

(52) U.S. Cl.
CPC ..... *G06K 7/10316* (2013.01); *G06K 19/0723* (2013.01); *G06K 19/07728* (2013.01)

(58) Field of Classification Search
USPC ................. 235/451, 486, 492, 375
See application file for complete search history.

(56) References Cited

U.S. PATENT DOCUMENTS

| | | | | |
|---|---|---|---|---|
| 6,307,517 B1* | 10/2001 | Lee | ...................... | G06K 7/0008 340/10.1 |
| 2004/0266486 A1* | 12/2004 | Deguchi | .............. | G06K 7/0008 455/562.1 |
| 2005/0001031 A1* | 1/2005 | Akiho | .................. | G06K 7/0008 235/451 |
| 2008/0238687 A1* | 10/2008 | Ozer | .................... | G06K 7/0008 340/572.7 |
| 2011/0136430 A1* | 6/2011 | Konya | ............... | G06K 7/10237 455/41.1 |
| 2013/0147670 A1* | 6/2013 | Nakano | .................. | H01Q 1/243 343/702 |

* cited by examiner

*Primary Examiner* — Tuyen K Vo

(57) ABSTRACT

A wireless user authentication system uses an AIDC device and a wireless reader to verify the identity of an individual. The AIDC device is a key fob that contains the user's credentials. The wireless reader is a device that wirelessly interrogates the AIDC device to ascertain the user's credentials. The wireless reader has a casing an interface window, a component cavity, a control panel, multiple antenna spacers, an antenna, and a processing unit. The casing is an enclosure that houses the components of the wireless reader within the component cavity. The interface window is hole that enables the user to access the control panel. the antenna spacers are rigid beams that retain the processing unit in a position that is offset from the control panel. Additionally, the antenna is wound around the antenna spacers and retained in a configuration that facilitates wirelessly communicating with the AIDC device.

15 Claims, 9 Drawing Sheets

WIRELESS USER AUTHENTICATION SYSTEM

The current application claims a priority to the U.S. Provisional Patent application Ser. No. 62/352,715 filed on Jun. 21, 2016.

FIELD OF THE INVENTION

The present invention relates generally to a wireless identification system. More specifically, the present invention relates to an RFID reader and an RFID tag that employ unique geometry to improve the performance of the RFID reader's antenna.

BACKGROUND OF THE INVENTION

Traditional keys are becoming obsolete as more secure electronic systems are developed. A popular keyless entry system employs the use of RFID tags and readers. These devices work in concert to identify users with electronic keys. Traditionally, RFID systems require the user holding the RFID tag to pass the tag within a short distance of the RFID reader. If the user is authorized, the RFID reader unlocks the door to which it is attached. These systems, however, can be bulky and unattractive. Additionally, traditional RFID identification systems are only effective over a limited range. The range of effectiveness is limited by the geometry of the antenna that is required for wirelessly transmitting and receiving information in the correct frequency.

The present invention, the wireless user identification system, is a system that employs a uniquely shaped antenna to increase the range of an RFID reader while decreasing the physical footprint of the RFID reader without decreasing the efficacy. This is accomplished by using a specialty antenna to optimize the read distance between the RFID reader and the RFID tag. This enables the present invention to increase the ease of use for a user. Furthermore, the present invention makes use of a uniquely designed key fob that holds the RFID tag. The key fob is intended to be buoyant so that the user will not lose their identification device if dropped into a body of water.

DETAIL DESCRIPTIONS OF THE INVENTION

All illustrations of the drawings are for the purpose of describing selected versions of the present invention and are not intended to limit the scope of the present invention.

As can be seen in FIG. 1 through FIG. 9, the present invention, the wireless user authentication system, is a system that makes use of a specifically shaped antenna to increase the read distance of a radio frequency identification (RFID) reader while decreasing the overall size of the device. Additionally, the present invention is designed to be a water-resistant system that can be submerged or inundated with water without being damaged. To accomplish this, the present invention comprises a wireless automatic identification and data capture (AIDC) device 1, and a wireless reader 2. The AIDC device 1 is a handheld device that contains a wireless communication module that is capable of transferring a user's credentials to an external reader when placed within the range of an antenna that is integrated into the reader. The AIDC device 1 is preferably a passive device that becomes activated or energized when placed within range of the antenna. The wireless reader 2 is a device that generates the signals required to communicate with and energize the AIDC whenever the AIDC is within range. Additionally, the wireless reader 2 is intended to generate an authentication command whenever the AIDC device 1 that is associated with an authorized user is placed within range. For example, if the wireless reader 2 is integrated into the lock of a gate, then the wireless reader 2 will generate an authentication command to unlock the gate if the AIDC device 1 is placed within several centimeters of the wireless reader 2. Specifically, the wireless reader 2 interrogates the AIDC device 1 to determine if the AIDC device 1 contains the requisite credentials to generate the authentication command.

Figure 5:
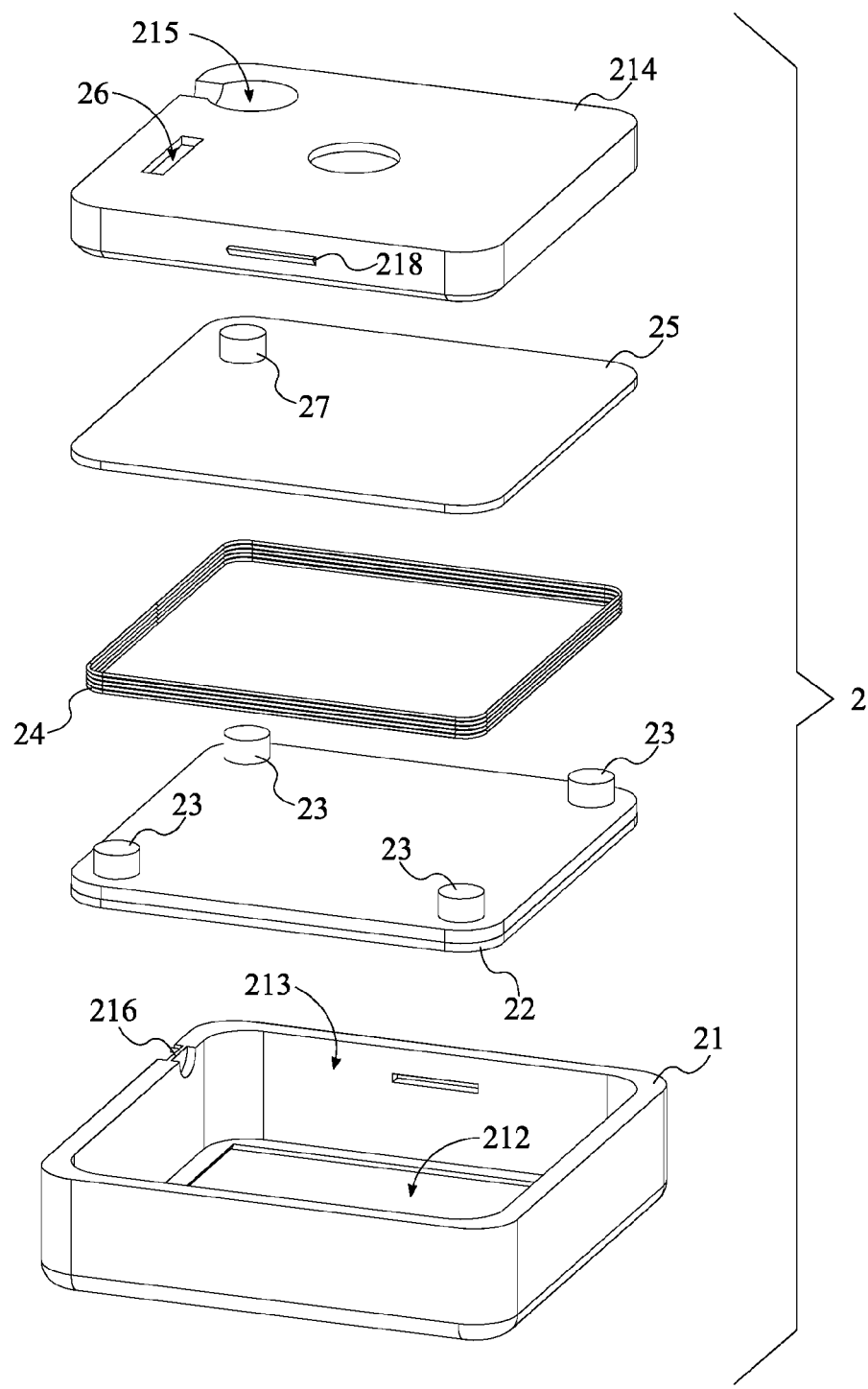
FIG. 5 is an exploded top perspective view of the wireless reader used in the present invention.
Figure 7:
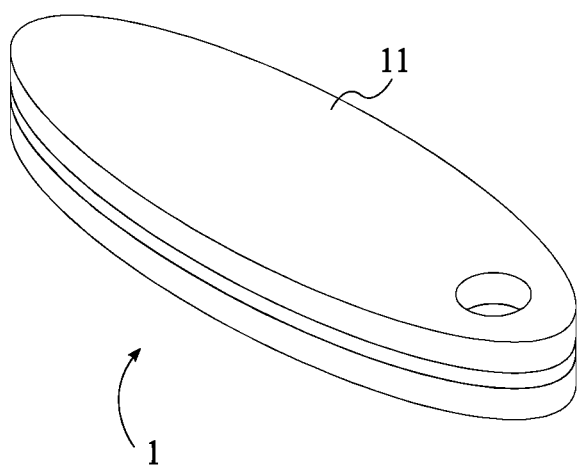
FIG. 7 is a perspective view of the AIDC device used in the present invention.

As can be seen in FIG. 5 and FIG. 7, to achieve the above-described functionalities, the wireless reader 2 comprises a casing 21, an interface window 212, a component cavity 213, a control panel 22, a plurality of antenna spacers 23, an antenna 24, and a processing unit 25. The casing 21 is a waterproof enclosure that houses the electronic components of the wireless reader 2. The processing unit 25 is a computing device used to govern the function of the electronic components of the wireless reader 2. The antenna 24 is a communication system that enables the wireless reader 2 to wirelessly transmit to and receive information from the AIDC device 1. As such, the AIDC device 1 is communicably coupled to the processing unit 25 through the antenna 24. Consequently, the processing unit 25 is able to analyze the data that is stored on the AIDC device 1 to determine if the AIDC device 1 contains the requisite credentials to generate the authentication command. In addition to sending and receiving data, the antenna 24 is intended to generate a magnetic field capable of energizing the AIDC device 1 once within range.

As can be seen in FIG. 1, FIG. 4, FIG. 5, and FIG. 7, the wireless reader 2 is preferably a compact device that can be mounted onto lockable entryways including, but not limited to, gates, doors, and boxes. The interface window 212 traverses into the casing 21 so that the user is able to access various components that are contained within the casing 21. Similarly, the component cavity 213 traverses into the casing 21, opposite to the interface window 212. Accordingly, the component cavity 213 creates a space within the casing 21 that is used to store the electronic components of the wireless reader 2. Specifically, the control panel 22, the plurality of antenna spacers 23, the antenna 24, and the processing unit 25 are mounted within the component cavity 213. Consequently, the control panel 22, the plurality of antenna spacers 23, the antenna 24, and the processing unit 25 are physically isolated from the external environment and protected from both physical damage and water damage. The wireless reader 2 is intended to have a secondary mode of user authentication that can be used to generate the authentication command in lieu of communicating with the AIDC device 1. The control panel 22 is a user-interfacing device that enables the user to generate commands and interact with the processing unit 25. As such, a front face of the control panel 22 is positioned adjacent to the interface window 212. Thus positioned, the user is able to interact with the control panel 22. For example, if a plurality of buttons is positioned on the front face of the control panel 22, then the plurality of buttons will be accessible through the interface window 212.

Figure 4:
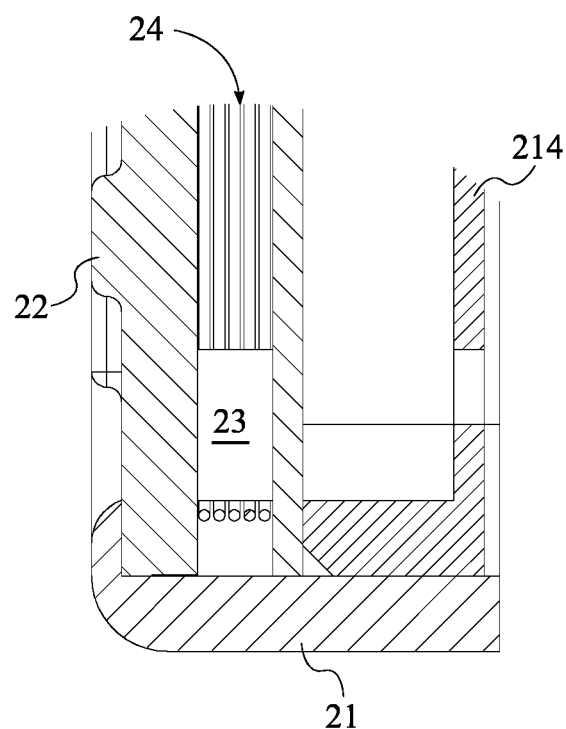
FIG. 4 is a detailed view of the wireless reader used in the present invention taken along line 4 in FIG. 3.

As can be seen in FIG. 4, FIG. 5, and FIG. 7, expounding on the descriptions of the antenna 24 and the processing unit 25, the antenna 24 is mounted within the component cavity 213 in such a way as to minimize the variation of magnetic flux that is produced. To accomplish this, each of the plurality of antenna spacers 23 is a rigid beam that is used to maintain the antenna 24 in a configuration that facilitates generating a consistent magnetic flux density and maximizes the range within which the antenna 24 is able to communicate with the AIDC device 1. Specifically, the plurality of antenna spacers 23 is perimetrically distributed across a rear face of the control panel 22, opposite to the interface window 212. Additionally, the processing unit 25 is adjacently connected to the plurality of antenna spacers 23 opposite to the control panel 22. Furthermore, the antenna 24 is wound around the plurality of antenna spacers 23. As a result of this configuration, the plurality of antenna spacers 23 creates a void between the processing unit 25 and the control panel 22. The antenna 24 is wound around the plurality of antenna spacers 23 within this void to create a coil capable of inductively coupling to the AIDC device 1. Each of the plurality of antenna spacers 23 is preferably 2 mm in length, and thus offsets the processing unit 25 from the control panel 22 by 2 mm. The control panel 22 and the antenna 24 are electronically connected to the processing unit 25 so that the processing unit 25 is able to send data to and receive data from the control panel 22 and the antenna 24. Finally, the antenna 24 is preferably a 73.4-microhenry coil capable of communicating over the 125-kilohertz frequency. This enables the antenna 24 to maximize the range within which the AIDC device 1 is able to be inductively coupled.

As can be seen in FIG. 4 and FIG. 5, the casing 21 is preferably a device that can be opened or closed by the user, as desired. To accomplish this, the wireless reader 2 further comprises a back panel 214. The back panel 214 is a rigid slab that functions as a door to restrict or allow access to the interior of the component cavity 213. As such, the back panel 214 is mounted over the component cavity 213 so that the back panel 214 is able to seal the component cavity 213. Additionally, the control panel 22, the plurality of antenna spacers 23, the antenna 24, and the processing unit 25 are pressed against the back panel 214. Consequently, the back panel 214 prevents the control panel 22, the plurality of antenna spacers 23, the antenna 24, and the processing unit 25 from falling out of the component cavity 213, while in place. Moreover, the component cavity 213 is hermetically sealed by the back panel 214. Accordingly, the wireless reader 2 becomes a waterproof device once the back panel 214 is mounted over the component cavity 213. In a first alternative embodiment of the present invention, some or all of the electronic components housed within the casing 21 are potted to generate resistance to shock and vibration, and for exclusion of moisture and corrosive agents.

Figure 6:
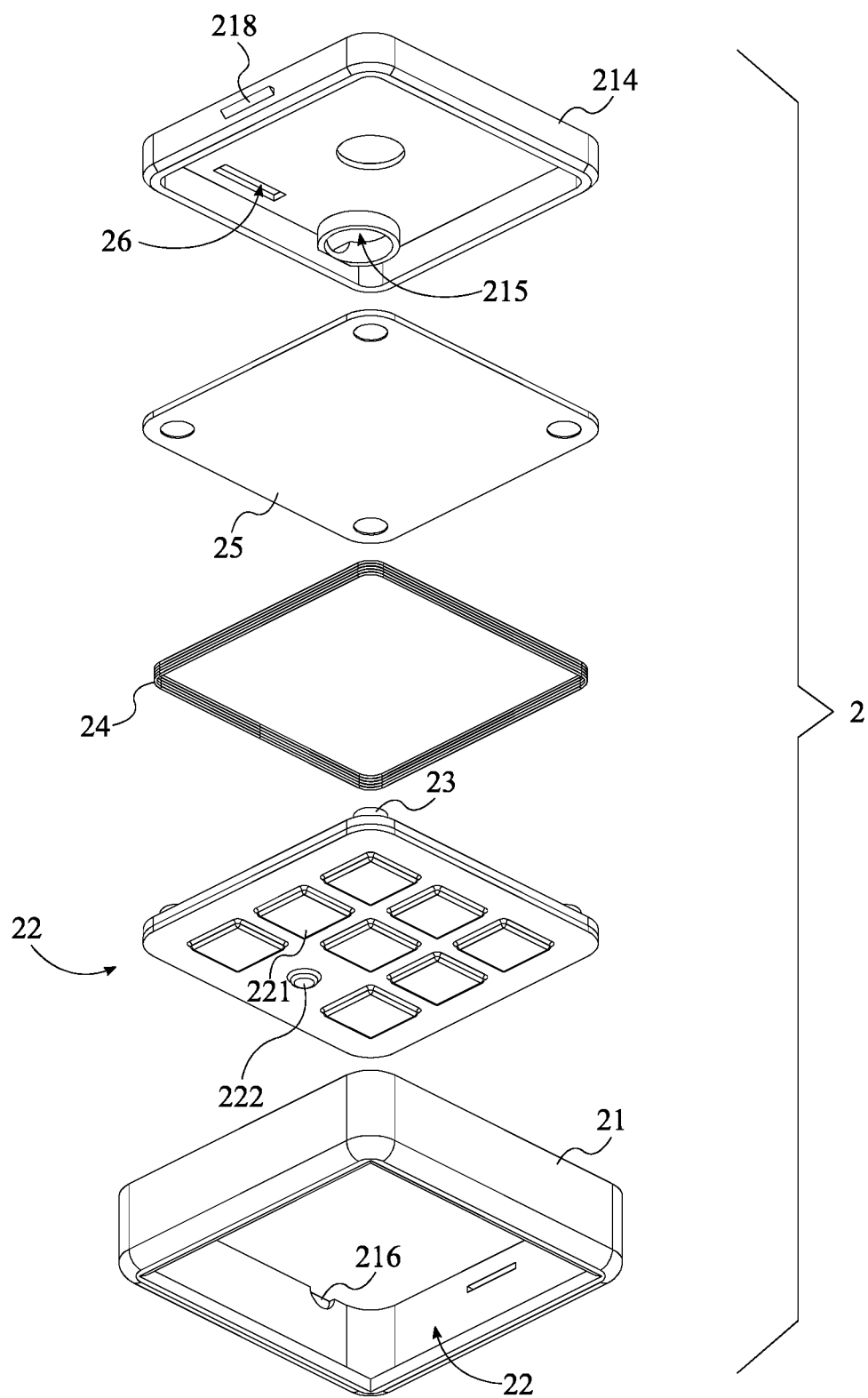
FIG. 6 is an exploded bottom perspective view of the wireless reader used in the present invention.

As can be seen in FIG. 6, the present invention is designed to be electronically connected to an external device so that the authentication command can be transmitted to said external device to perform an action, such as unlocking a door. To that end, the wireless reader 2 further comprises an external device port 26. The external device port 26 is an electrical receptacle into which the male end of a cable, or other electrical connector, can be inserted. Additionally, the external device port 26 is integrated into the back panel 214 so that the external device can be connected to the wireless reader 2 without removing the back panel 214. Furthermore, the external device port 26 is electronically connected to the processing unit 25. Accordingly, the processing unit 25 is able to exchange data and electrical power with the external device through the external device port 26.

As can be seen in FIG. 5 and FIG. 6, the back panel 214 can preferably be dismounted from the casing 21 to enable the user to remove or repair the electrical components housed within the casing 21. Additionally, the back panel 214 can be locked into place once mounted over the component cavity 213. To accomplish this, the wireless reader 2 further comprises a locking mechanism 218. The locking mechanism 218 can be, but is not limited to being, a latch, an interlocking member, a clasp, or a clip. Additionally, the locking mechanism 218 is operatively integrated in between the back panel 214 and the casing 21, wherein the locking mechanism 218 is used to prevent the back panel 214 from being disconnected from the casing 21. Consequently, the locking mechanism 218 is a device that the user engages or disengages when mounting or dismounting the back panel 214 from over the component cavity 213. The locking mechanism 218 is preferably an interlocking member that consists of a lip and a receptacle. The lip is slid into the receptacle as the back panel 214 is pressed into position over the component cavity 213.

As can be seen in FIG. 5, the present invention is designed to generate audible notifications to alert the user of the physical and electrical state of the wireless reader 2. For example, if the AIDC device 1 is placed within range of the antenna 24, then the wireless reader 2 will generate a beeping sound. To accomplish this, the wireless reader 2 further comprises a speaker 27 and a speaker channel 215. The speaker 27 is mounted adjacent to the processing unit 25, opposite to the plurality of antenna spacers 23 so that the speaker 27 is maintained in a position that facilitates outputting audible notifications. Additionally, the speaker 27 is electronically connected to the processing unit 25. As a result, the processing unit 25 is able to control when the speaker 27 produces audible notifications as well as the type of audible notification that is produced. The speaker channel 215 traverses through the casing 21 and the back panel 214. Furthermore, the speaker channel 215 traverses into the component cavity 213. Moreover, an output of the speaker 27 is oriented toward the speaker channel 215. As a result, the audible notifications generated by the speaker 27 are able to exit the component cavity 213 without being muffled by the casing 21 or the back panel 214. The present invention is able to produce audible notifications without compromising the waterproof characteristics of the casing 21 because the wireless reader 2 further comprises a channel cap 216. The channel cap 216 is a membrane that is used to prevent water from entering the speaker channel 215. Additionally, the channel cap 216 does not muffle the output of the speaker 27. To accomplish this, the channel cap 216 is hermetically and terminally mounted onto the speaker channel 215. Thus positioned, the channel cap 216 preserves the waterproof characteristics of the casing 21. Furthermore, the channel cap 216 is preferably a removable device that can be dismounted from the terminal end of the speaker channel 215 as desired. Once the channel cap 216 is removed, the output of the speaker 27 is able to travel through the speaker channel 215, unimpeded. In the first alternative embodiment of the present invention, the channel cap 216 is equipped with a valve that the user can turn to open the speaker channel 215.

As can be seen in FIG. 6 and FIG. 7, as described above, the control panel 22 is designed to enable the user to interact with the wireless reader 2 without the use of the AIDC device 1. To accomplish this, the control panel 22 comprises a keypad 221. The keypad 221 is a collection of physical buttons that enable the user to input commands into the wireless reader 2. As such, the keypad 221 is integrated into the front face of the control panel 22. Additionally, the keypad 221 is framed within the interface window 212. Thus, the keypad 221 is positioned to enable the user to press the physical buttons while inputting commands. For example, if the user has lost the AIDC device 1, the user can enter a password into the keypad 221 to generate an authentication command. The keypad 221 is preferably arranged into a 3×3 grid of physical buttons. In the first alternative embodiment of the present invention, the control panel 22 is a touch screen display. The control panel 22 comprises a visual output device 222. The visual output device 222 is preferably a light emitting diode that flashes to indicate the electrical state of the wireless reader 2. The visual output device 222 is integrated into the front face of the control panel 22. additionally, the visual output device 222 is framed within the interface window 212. Accordingly, the visual output device 222 is positioned to facilitate visual inspection by the user.

Figure 9:
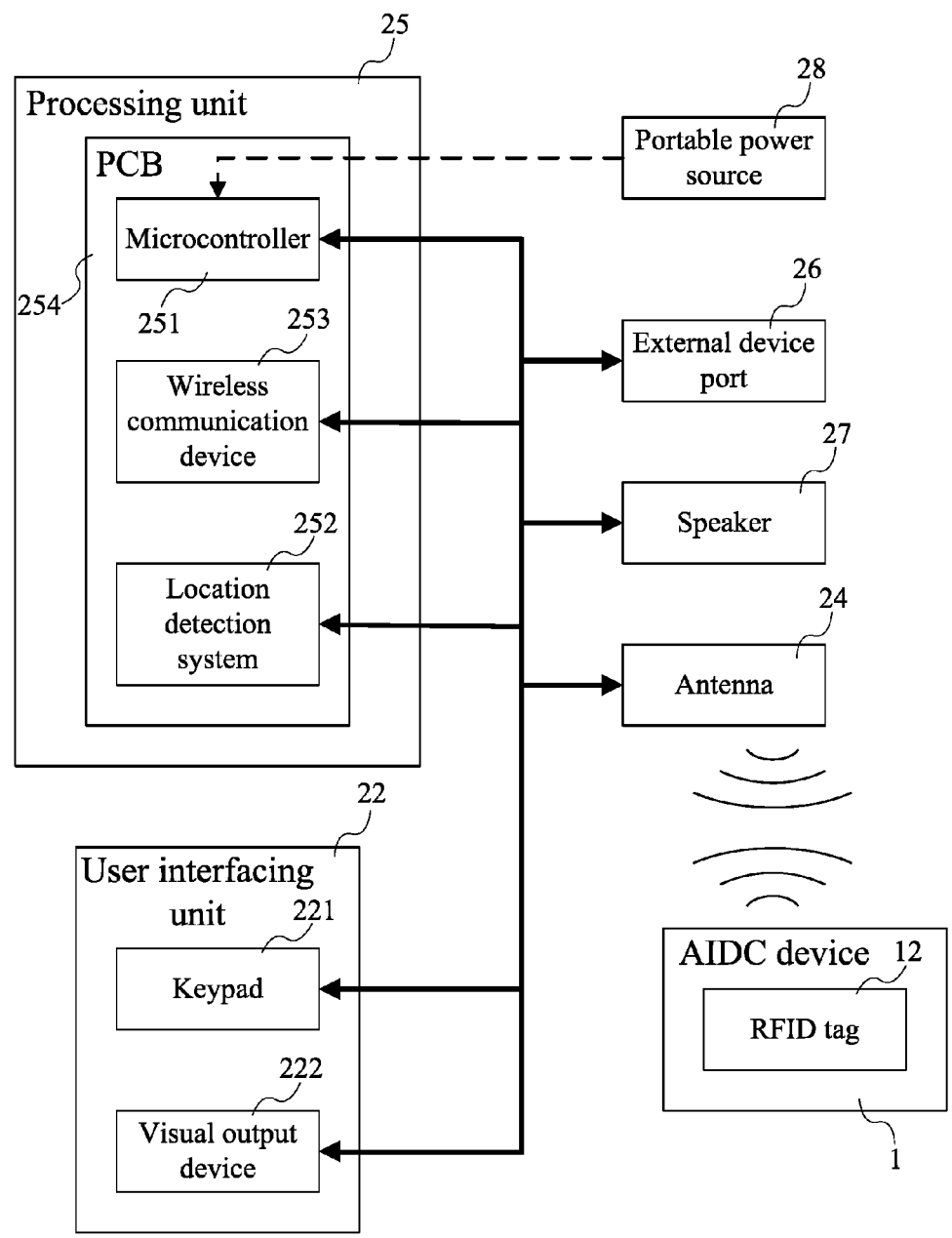
FIG. 9 is a block diagram illustrating the electrical components of the present invention where bold lines indicate electronic connections and dashed lines indicate electrical connections.

As can be seen in FIG. 5, FIG. 7, and FIG. 9, the processing unit 25 is the central processor that controls the operations of the wireless reader 2. As such, the processing unit 25 comprises a printed circuit board (PCB) 254 and a microprocessor 251. The PCB 254 is a rigid circuit board that structurally supports and electronically connects the components of the processing unit 25. as such, the microprocessor 251 is mounted onto the PCB 254 so that the microprocessor 251 is maintained in a fixed position within the component cavity 213. The processing unit 25 further comprises a location detection system 252 and a wireless communication device 253. The location detection system 252 is a device that is used to determine the geographic location of the wireless reader 2. This functionality can be accomplished by devices including, but not limited to, GPS modules and GLONASS modules. The wireless communication device 253 is a wireless radio capable of transmitting and receiving data via communication protocols that include, but are not limited to, Wi-Fi, Bluetooth, GPRS, and GSM. The location detection system 252 and the wireless communication device 253 are mounted onto the PCB 254. Additionally, the location detection system 252 and the wireless communication device 253 are electronically connected to the microprocessor 251. The wireless communication device 253 enables the user to wirelessly control the wireless reader 2 without using the AIDC device 1. For example, if the user has lost the AIDC device 1 and forgotten the password for the control panel 22, then the user will be able to transmit an authentication command from an authorized computing device, such as a mobile phone or a computer. Additionally, the wireless communication device 253 is able to transmit notifications and messages to the user's computing device. In the first alternative embodiment of the present invention the wireless communication device 253 is an antenna a copper traceland pattern that is etched onto the PCB 254. The wireless reader 2 further comprises a portable power source 28. The portable power source 28 is preferably a rechargeable battery that provides the electrical power required for the electronic components of the wireless reader 2 to operate. The portable power source 28 is mounted within the component cavity 213 so that the portable power source 28 is protected from moisture and physical damage. Additionally, the portable power source 28 is electrically connected to the processing unit 25. As a result, the portable power source 28 is able to supply electrical power to the processing unit 25, which then supplies electrical power to the remaining electronic components of the wireless reader 2.

Figure 1:
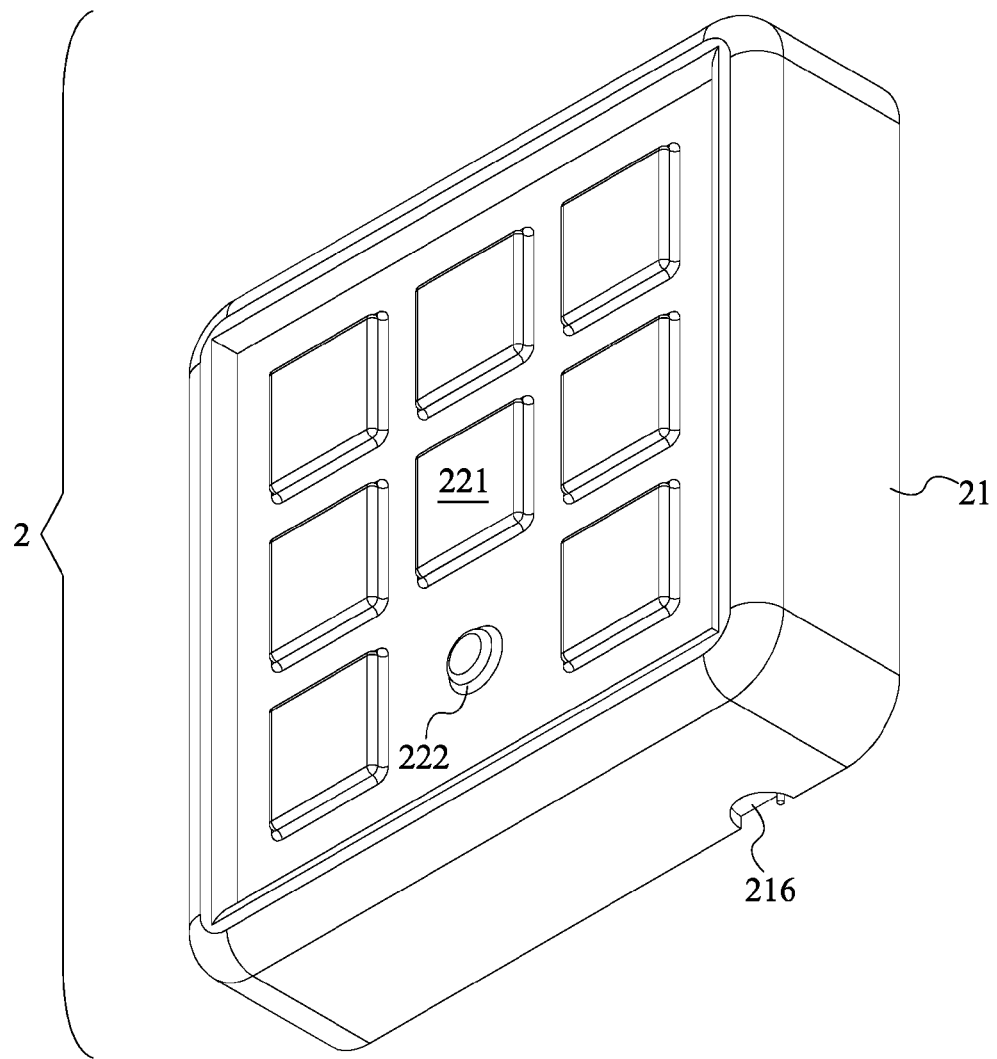
FIG. 1 is a perspective view of the wireless reader used in the present invention.
Figure 2:
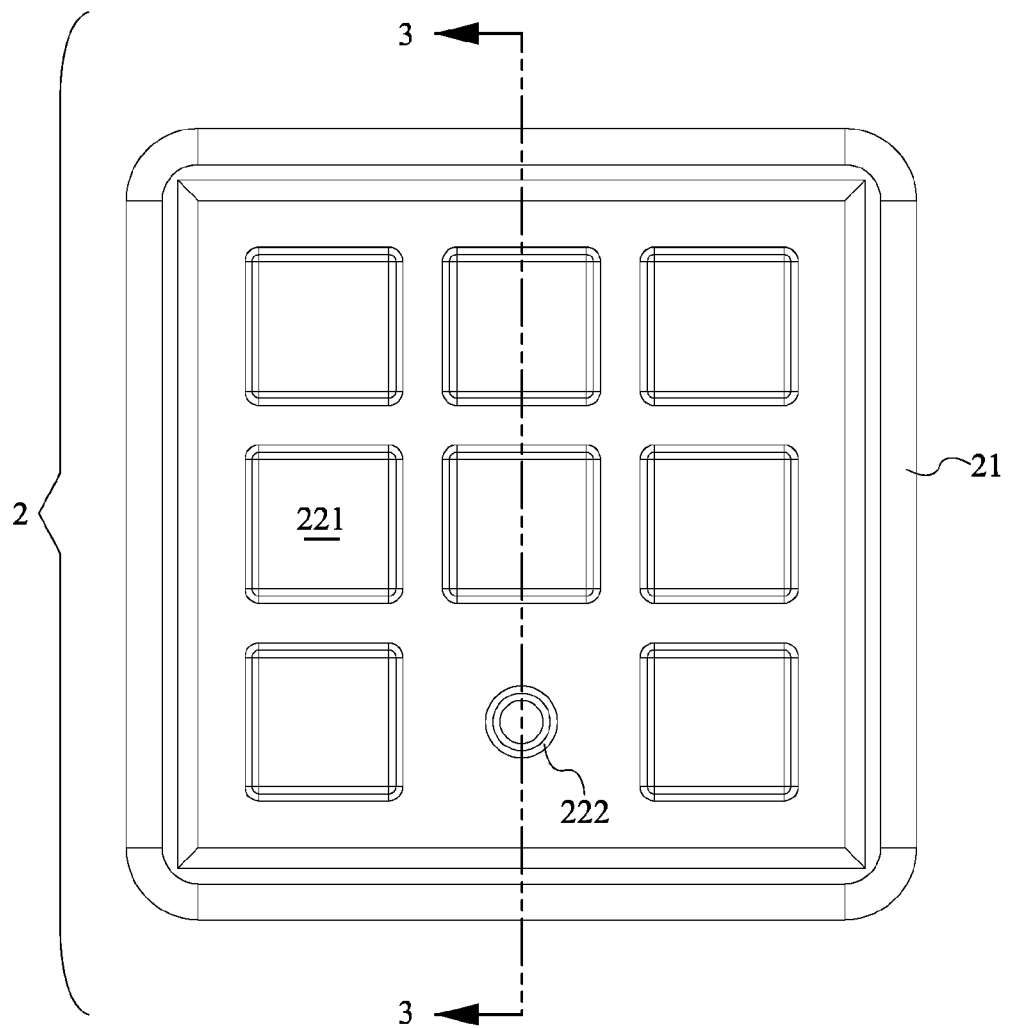
FIG. 2 is a front view of the present invention.
Figure 3:
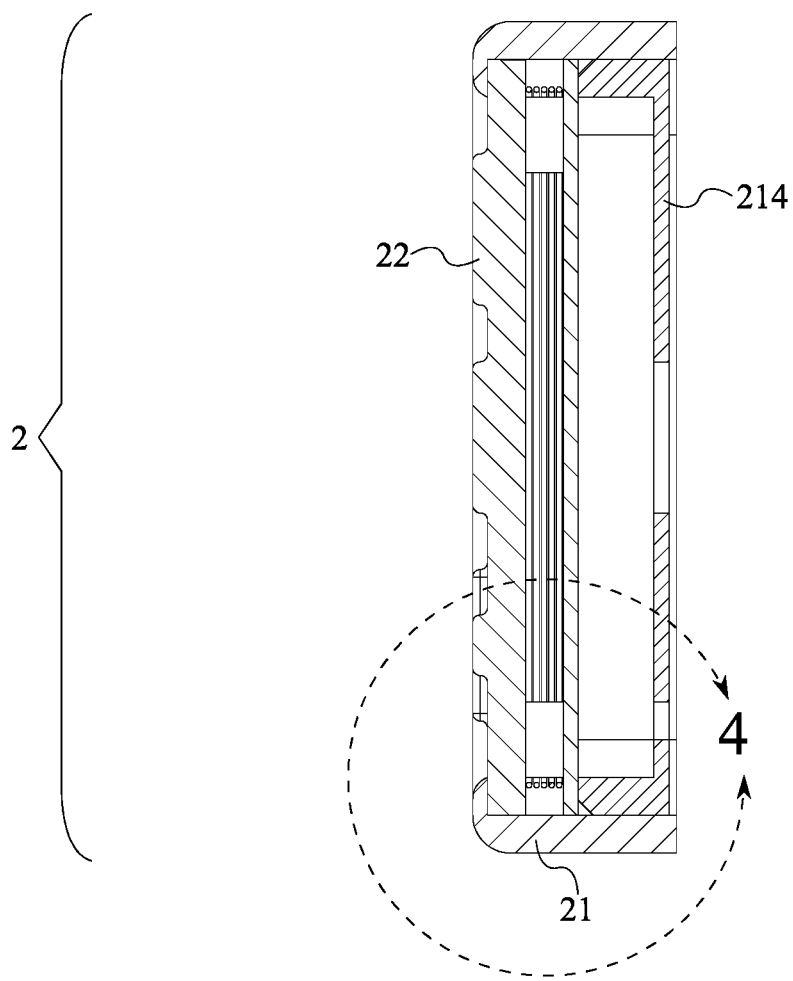
FIG. 3 is a sectional view of the wireless reader used in the present invention taken along line 3-3 in FIG. 2.
Figure 8:
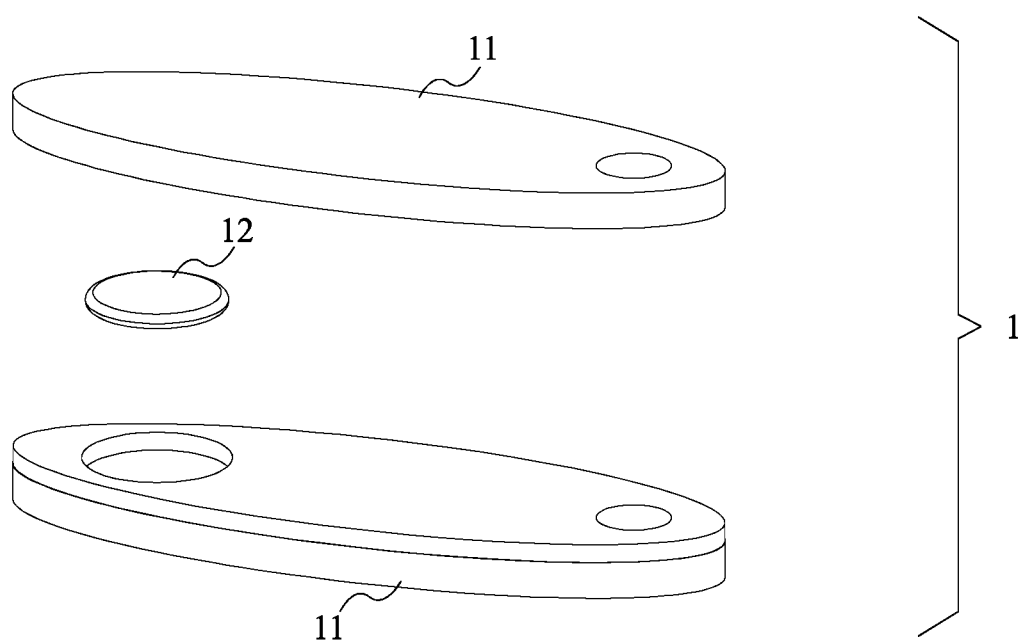
FIG. 8 is an exploded perspective view of the AIDC device used in the present invention.

As can be seen in FIG. 2, FIG. 7, and FIG. 8, in the preferred embodiment of the present invention, the AIDC device 1 is a waterproof device that is ergonomically shaped to facilitate grasping. The AIDC device 1 comprises a buoyant enclosure 11 and a RFID tag 12. The buoyant enclosure 11 is designed to float when dropped into water so that the user cannot lose the AIDC device 1 in a body of water. Furthermore, the RFID tag 12 is encased within the buoyant enclosure 11. Thus positioned, the RFID tag 12 is prevented from being crushed by hazards in the external environment. Additionally, the RFID tag 12 is positioned to facilitate communicating with the wireless reader 2. The RFID tag 12 can be any type of RFID device including, but not limited to, an RFID disk or an RFID nail. In the first alternative embodiment of the present invention, the AIDC device 1 has an end exciting RFID tag 12 that is positioned adjacent to a lateral surface of the AIDC device 1. This positioning increases the efficiency of data transmission between the AIDC device 1 and the wireless reader 2.

Although the invention has been explained in relation to its preferred embodiment, it is to be understood that many other possible modifications and variations can be made without departing from the spirit and scope of the invention as hereinafter claimed.

What is claimed is:
1. A wireless user authentication system comprises:
   a wireless automatic identification and data capture (AIDC) device;
   a wireless reader;
   the wireless reader comprises a casing, an interface window, a component cavity, a control panel, a plurality of antenna spacers, an antenna, and a processing unit;
   the AIDC device being communicably coupled to the processing unit through the antenna;
   the interface window traversing into the casing;
   the component cavity traversing into the casing, opposite to the interface window;
   the control panel, the plurality of antenna spacers, the antenna, and the processing unit being mounted within the component cavity;
   a front face of the control panel being positioned adjacent to the interface window;
   the plurality of antenna spacers being perimetrically distributed across a rear face of the control panel, opposite to the interface window;
   the processing unit being adjacently connected to the plurality of antenna spacers opposite to the control panel;

the antenna being wound around the plurality of antenna spacers; and the control panel and the antenna being electronically connected to the processing unit.

2. The wireless user authentication system as claimed in claim 1 comprises, wherein the antenna being a 73.4-microhenry coil is capable of communicating over the 125-kilohertz frequency.

3. The wireless user authentication system as claimed in claim 1 comprises:

the wireless reader further comprises a back panel;

the back panel being mounted over the component cavity; and the control panel, the plurality of antenna spacers, the antenna, and the processing unit being pressed against the back panel.

4. The wireless user authentication system as claimed in claim 3 comprises:

the component cavity being hermetically sealed by the back panel.

5. The wireless user authentication system as claimed in claim 3 comprises:

the wireless reader further comprises an external device port;

the external device port being integrated into the back panel; and the external device port being electronically connected to the processing unit.

6. The wireless user authentication system as claimed in claim 3 comprises:

the wireless reader further comprises a locking mechanism; and the locking mechanism being operatively integrated in between the back panel and the casing, wherein the locking mechanism is used to prevent the back panel from being disconnected from the casing.

7. The wireless user authentication system as claimed in claim 1 comprises:

the wireless reader further comprises a back panel, a speaker, and a speaker channel;

the speaker being mounted adjacent to the processing unit, opposite to the plurality of antenna spacers;

the speaker being electronically connected to the processing unit;

the speaker channel traversing through the casing and the back panel;

the speaker channel traversing into the component cavity; and an output of the speaker being oriented toward the speaker channel.

8. The wireless user authentication system as claimed in claim 7 comprises:

the wireless reader further comprises a channel cap; and the channel cap being hermetically and terminally mounted onto the speaker channel.

9. The wireless user authentication system as claimed in claim 1 comprises:

the control panel comprises a keypad;

the keypad being integrated into the front face of the control panel; and the keypad being framed within the interface window.

10. The wireless user authentication system as claimed in claim 1 comprises:

the control panel comprises a visual output device;

the visual output device being integrated into the front face of the control panel; and the visual output device being framed within the interface window.

11. The wireless user authentication system as claimed in claim 1 comprises:

the processing unit comprises a printed circuit board (PCB) and a microcontroller; and the microcontroller being mounted onto the PCB.

12. The wireless user authentication system as claimed in claim 11 comprises:

the processing unit further comprises a location detection system;

the location detection system being mounted onto the PCB; and the location detection system being electronically connected to the microcontroller.

13. The wireless user authentication system as claimed in claim 11 comprises:

the processing unit further comprises a wireless communication device;

the wireless communication device being mounted onto the PCB; and the wireless communication device being electronically connected to the microcontroller.

14. The wireless user authentication system as claimed in claim 1 comprises:

the wireless reader further comprises a portable power source;

the portable power source being mounted within the component cavity; and the portable power source being electrically connected to the processing unit.

15. The wireless user authentication system as claimed in claim 1 comprises:

the AIDC device comprises a buoyant enclosure and a radio frequency identification (RFID) tag; and the RFID tag being encased within the buoyant enclosure.

* * * * *